United States Patent
Noda et al.

(10) Patent No.: US 12,266,803 B2
(45) Date of Patent: Apr. 1, 2025

(54) SECONDARY BATTERY NEGATIVE ELECTRODE, SECONDARY BATTERY, AND MANUFACTURING METHOD OF SECONDARY BATTERY NEGATIVE ELECTRODE

(71) Applicants: WASEDA UNIVERSITY, Tokyo (JP); ZEON CORPORATION, Tokyo (JP)

(72) Inventors: Suguru Noda, Tokyo (JP); Keisuke Hori, Tokyo (JP); Tomotaro Mae, Tokyo (JP); Yuta Hashizume, Tokyo (JP)

(73) Assignees: WASEDA UNIVERSITY, Tokyo (JP); ZEON CORPORATION, Tokyo (JP)

( * ) Notice: Subject to any disclaimer, the term of this patent is extended or adjusted under 35 U.S.C. 154(b) by 711 days.

(21) Appl. No.: 17/430,569

(22) PCT Filed: Feb. 25, 2020

(86) PCT No.: PCT/JP2020/007518
§ 371 (c)(1),
(2) Date: Aug. 12, 2021

(87) PCT Pub. No.: WO2020/175488
PCT Pub. Date: Sep. 3, 2020

(65) Prior Publication Data
US 2022/0140351 A1    May 5, 2022

(30) Foreign Application Priority Data
Feb. 26, 2019   (JP) ................................ 2019-033081

(51) Int. Cl.
*H01M 4/80*   (2006.01)
*H01M 4/134*   (2010.01)
(Continued)

(52) U.S. Cl.
CPC ........... *H01M 4/808* (2013.01); *H01M 4/134* (2013.01); *H01M 4/38* (2013.01); *H01M 4/381* (2013.01);
(Continued)

(58) Field of Classification Search
CPC ........ H01M 4/808; H01M 4/134; H01M 4/38; H01M 4/381; H01M 4/382; H01M 4/62;
(Continued)

(56) References Cited

U.S. PATENT DOCUMENTS

2005/0079416 A1*   4/2005   Ohzuku ................ H01M 4/485
                                                                           423/594.2
2010/0159331 A1    6/2010   Lee et al.
(Continued)

FOREIGN PATENT DOCUMENTS

CN     107146889     9/2017
CN     107910496     4/2018
(Continued)

OTHER PUBLICATIONS

Yang et al.; Ultrafine Silver Nanoparticles for Seeded Lithium Deposition toward Stable Lithium Metal Anode, 2017, Advanced Materials, 29, 170714, https://doi.org/10.1002/adma.201702714 (Year: 2017).*
(Continued)

*Primary Examiner* — Maria Laios
*Assistant Examiner* — Ziheng Lu
(74) *Attorney, Agent, or Firm* — Fox Rothschild LLP; Carol E. Thorstad-Forsyth

(57) ABSTRACT

A secondary battery negative electrode according to the invention includes: a three-dimensional current collector formed of a self-supporting sponge-like structure of carbon nanotubes; a metal active material contained inside the three-dimensional current collector; and a plurality of seed
(Continued)

particles contained inside the three-dimensional current collector and made of a material different from the metal active material, in which the secondary battery negative electrode does not include a foil of the metal active material.

8 Claims, 10 Drawing Sheets

(51) Int. Cl.
    *H01M 4/38*     (2006.01)
    *H01M 4/62*     (2006.01)
    *H01M 4/66*     (2006.01)
    *H01M 10/052*     (2010.01)
    *H01M 10/054*     (2010.01)

(52) U.S. Cl.
    CPC ............. *H01M 4/382* (2013.01); *H01M 4/62* (2013.01); *H01M 4/663* (2013.01); *H01M 10/052* (2013.01); *H01M 10/054* (2013.01)

(58) Field of Classification Search
    CPC ... H01M 4/663; H01M 10/052; H01M 10/054
    See application file for complete search history.

(56) References Cited

U.S. PATENT DOCUMENTS

| | | | | |
|---|---|---|---|---|
| 2013/0319870 A1* | 12/2013 | Chen | ............ | H01M 4/587 |
| | | | | 977/734 |
| 2014/0141314 A1 | 5/2014 | Kaneda | | |
| 2014/0205904 A1 | 7/2014 | Sasaki | | |
| 2017/0256791 A1* | 9/2017 | Kurita | ............ | C04B 35/62685 |
| 2018/0287195 A1 | 10/2018 | Luo et al. | | |

FOREIGN PATENT DOCUMENTS

| | | | | |
|---|---|---|---|---|
| CN | 107910496 A | * | 4/2018 | ............ B82Y 30/00 |
| CN | 109088051 | | 12/2018 | |
| JP | 2018113108 A | | 7/2018 | |
| KR | 20130008870 A | | 1/2013 | |
| WO | 2009110591 A1 | | 9/2009 | |

OTHER PUBLICATIONS

Filchakova et al., Single-walled carbon nanotubes: structure, properties, applications, and health & safety, 2021, Tuball, https://tuball.com/articles/single-walled-carbon-nanotubes (Year: 2021).*

Pasa et al., Electrodeposition, 2006, Encyclopedia of Chemical Processing, DOI: 10.1081/E-ECHP-120037171 (Year: 2006).*

Hashizume, Hori, Morishita, Nishimura, Yarnada, Yamada and Noda, (2018) "Electrochemical Performance of Silicon-Carbon Nanotube Self-Supporting Film", Department of Applied Chemistry, Waseda University. (The 59th Battery Symposium in Japan), p. 281, Nov. 26, 2018.

International Search Report issued in PCT/JP2020/007518 dated Apr. 14, 2020.

Salvatierra, Rodrigo & López-Silva, Gladys & Jalilov, Almaz & Yoon, Jongwon & Wu, Gang & Tsai, Ah-Lim & Tour, James. (2018). "Suppressing Li Metal Dendrites Through a Solid Li-Ion Backup Layer". Advanced Materials. 30.10.1002/adma.201803869.

EESR issued on Jul. 2, 2024 in Application No. 20762187.1.

English Translation of First Office Action issued Feb. 27, 2024 by the Chinese National Intellectual Property Administration for Chinese Patent Application No. 202080015628.2 (7 pages).

* cited by examiner

SECONDARY BATTERY NEGATIVE ELECTRODE, SECONDARY BATTERY, AND MANUFACTURING METHOD OF SECONDARY BATTERY NEGATIVE ELECTRODE

CROSS-REFERENCE TO RELATED APPLICATIONS

The present application is a U.S. National Phase of International Patent Application No. PCT/JP2020/007518, filed on Feb. 25, 2020, which claims the benefit and priority of Japanese Patent Application No. 2019-033081 filed on Feb. 26, 2019. The contents of the above applications are incorporated herein by reference in their entirety.

TECHNICAL FIELD

The present invention relates to a secondary battery negative electrode, a secondary battery, and method of manufacturing a secondary battery negative electrode.

BACKGROUND ART

A metal negative electrode using a metal active material such as metal lithium (Li) has a high theoretical capacity and a low negative electrode potential, and is thus attracting attention as a secondary battery negative electrode having a high energy density. However, in a secondary battery using the metal negative electrode, there is a problem that, a metal dendrite grows on a surface of the metal negative electrode due to the stripping and plating of a metal during charging and discharging, and the grown dendrite penetrates a separator and comes into contact with a positive electrode, leading to a short circuit between the positive electrode and the negative electrode. Therefore, a metal negative electrode that prevents the generation of the dendrite has been proposed (for example, Non-PTL 1).

Non-PTL 1 describes a metal negative electrode in which a Li-doped multiwall carbon nanotube (MWCNT) layer is formed on a surface of a metal Li foil. In the metal negative electrode described in Non-PTL 1, since the inflow and outflow of Li ions are regulated by the MWCNT layer, the generation of the dendrite is prevented.

CITATION LIST

Non Patent Literature

Non-PTL 1: Rodrigo V. Salvatierra et. al., Advanced Materials, 30, 1803869 (2018)

SUMMARY OF INVENTION

Technical Problem

In the metal negative electrode of Non-PTL 1, the MWCNT layer having a thickness of 25 μm is provided on the metal Li foil having a thickness of 130 μm to 230 μm. In the metal negative electrode of Non-PTL 1, the metal Li foil serves as both a current collector and an active material, and contains an excess amount of metal Li that is several tens of times an amount of metal Li contributing to charging and discharging. Therefore, in the metal negative electrode of Non-PTL 1, a gravimetric capacity and a volumetric capacity are low, and a demand for a high energy density cannot be sufficiently satisfied.

An object of the invention is to provide a secondary battery negative electrode, which prevents the generation of a dendrite and has a high gravimetric capacity and a high volumetric capacity, a secondary battery, and a method of manufacturing a secondary battery negative electrode.

Solution to Problem

A secondary battery negative electrode according to the invention includes: a three-dimensional current collector formed of a self-supporting sponge-like structure of carbon nanotubes; a metal active material contained inside the three-dimensional current collector; and a plurality of seed particles contained inside the three-dimensional current collector and made of a material different from the metal active material, in which the secondary battery negative electrode does not include a foil of the metal active material.

A secondary battery according to the invention includes: the above secondary battery negative electrode; and a secondary battery positive electrode whose thickness changes reversibly with charging and discharging and whose thickness decreases during charging and increases during discharging.

A method of manufacturing a secondary battery negative electrode according to the invention includes: compositing carbon nanotubes, a metal active material, and seed particles.

Advantageous Effect

According to the invention, by providing plurality of seed particles that serve as nuclei for plating Li during charging, the generation of a large dendrite that causes a short circuit between a positive electrode and a negative electrode is prevented. In addition, since the metal active material is contained inside the three-dimensional current collector and the foil of the metal active material is not contained, a gravimetric capacity and a volumetric capacity can be increased. Further, since the three-dimensional current collector is made of a sponge-like structure, the thickness is reversibly changed during charging and discharging, and a space in the secondary battery can be effectively used to increase the volumetric capacity.

A secondary battery negative electrode, which prevents the generation of a dendrite and has a high gravimetric capacity and a high volumetric capacity by containing the metal active material and the plurality of seed particles inside the three-dimensional current collector formed a self-supporting sponge-like structure of carbon nanotubes and by not containing the foil of the metal active material, a secondary battery, and a method of manufacturing a secondary battery negative electrode can be provided.

DESCRIPTION OF EMBODIMENTS

Hereinafter, the present embodiment will be described in detail with reference to the drawings.

1. Overall Configuration

Figure 1:
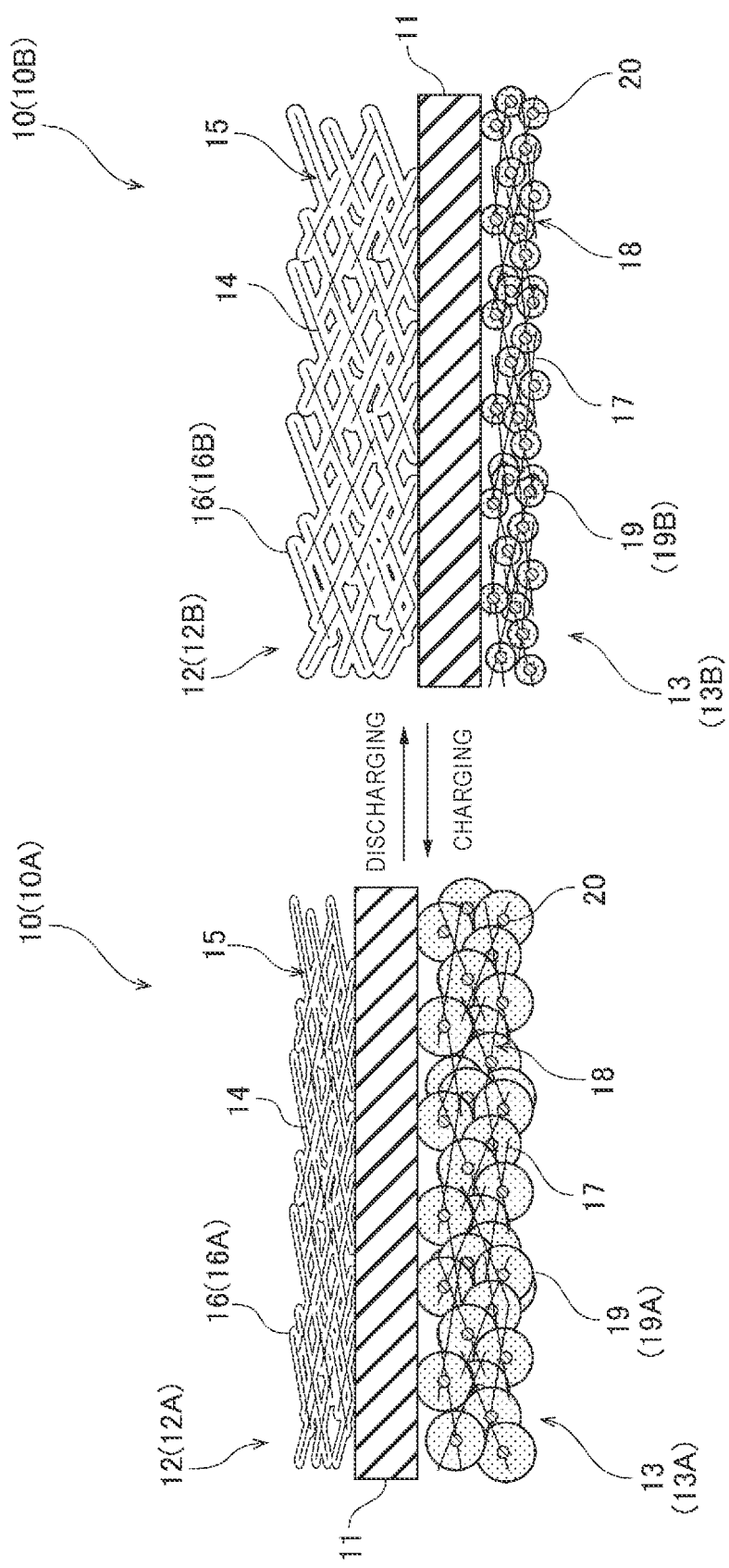
FIG. 1 is a schematic view showing a configuration of secondary battery in a charged state and in a discharged state according to an embodiment.

In FIG. 1, a secondary battery 10 (10A, 10B) according to the present embodiment includes a separator 11, a secondary battery positive electrode (hereinafter referred to as a positive electrode) 12 (12A, 12B), a secondary battery negative electrode (hereinafter referred to as a negative electrode) (13A, 13B), an electrolyte (not shown), and a case (not shown).

The secondary battery 10A in a charged state includes the contracted positive electrode 12A and the expanded negative electrode 13A disposed with the separator 11 therebetween. The secondary battery 10B in a discharged state includes the expanded positive electrode 12B and the contracted negative electrode 13B disposed with the separator 11 therebetween. The secondary battery 10 of the present embodiment is a lithium ion secondary battery in which lithium (Li) ions move between the positive electrode 12 and the negative electrode 13 through the separator 11 by charging and discharging.

The secondary battery 10 is provided with the positive electrode 12 on one surface of the separator 11 and the negative electrode 13 on the other surface of the separator 11. The secondary battery is implemented by housing the separator 11, the positive electrode 12, the negative electrode 13, and the electrolyte in the case.

The electrolyte is not particularly limited, and commonly used electrolytes such as a non-aqueous electrolyte, an ionic liquid, and a gel electrolyte can be used. For example, the non-aqueous electrolyte can be prepared by dissolving 1.0 mol/L of $LiPF_6$ in a mixed solution of ethylene carbonate (EC) and dimethyl carbonate (DMC). A volume ratio of EC and DMC is generally about 1:2.

The case is not particularly limited, and a can made of a metal such as iron, stainless steel, or aluminum, which is generally used as a battery can, can be used. From the viewpoint of a gravimetric energy density, a metal-resin composite material in which a metal foil and a resin film are laminated is preferred.

The separator 11 can be made of a microporous polymer film. Examples of the microporous polymer film include polyolefin-based, polyester-based, polyacrylonitrile-based, polyphenylene sulfide-based, polyimide-based, or fluororesin-based micropore membranes and non-woven fabrics. The separator 11 may be formed of a self-supporting sponge-like structure of insulating fibers. The sponge-like structure is a film having a plurality of pores therein. Examples of the sponge-like structure include non-woven fabrics. The insulating fibers are boron nitride nanotubes (BNNT) or organic nanofibers. Examples of the organic nanofibers include cellulose nanofibers (CNF) and chitin nanofibers.

As the positive electrode 12, various positive electrodes used in general secondary batteries can be used. In particular, it is preferable to use a positive electrode whose thickness changes reversibly with charging and discharging, whose thickness decreases during charging (12A) and whose thickness increases during discharging (12B), because the space inside the secondary battery can be effectively used. When a volume of the positive electrode 12 changes with charging and discharging, an area of a surface in contact with the separator 11 does not substantially change, and the positive electrode 12 contracts or expands as the thickness changes. That the volume of the positive electrode 12 changes according to the thickness.

As a positive electrode active material 16 (16A, 16B), a lithium transition metal complex oxide such as lithium cobalt oxide ($LiCoO_2$), lithium manganese oxide ($LiMn_2O_4$), lithium iron phosphate ($LiFePO_4$), and NMC ($LiNi_xMn_yCo_zO_2$) or NCA ($LiNi_xCo_yAl_zO_2$), which is a composite of two or more transition metals, and an active material such as sulfur whose volume changes by reacting with lithium to form a compound are used. When an active material such as sulfur whose volume changes by reacting with lithium is used as the positive electrode active material 16, a change in the thickness of the positive electrode 12 during charging and discharging is large, and the expansion and contraction is canceled each other out between the positive electrode 12 during charging and discharging and the negative electrode 13 using a metal active material described later, so that a change the thickness of the secondary battery 10 is prevented. Therefore, as the positive electrode active material 16, it is desirable to use an active material such as sulfur whose volume changes by reacting with lithium. An active material having a larger volume change can have a higher volumetric capacity, an active material whose volume chances 1.15 times or more is preferred, an active material whose volume changes 1.3 times or more is more preferred, and an active material whose volume changes 1.6 times or more is particularly preferred. When using an active material whose volume changes 1.15 times or more, in order to make the volume change reversible, it is preferable to contain the positive electrode active material 16 inside a first three-dimensional current collector 15 formed of a self-supporting sponge-like structure of first carbon nanotubes (CNT) 14.

Hereinafter, the negative electrode (secondary battery negative electrode) 13 according to the present embodiment will be described. A thickness of the negative electrode 13 changes reversibly with charging and discharging, and the thickness increases during charging (13A) and the thickness decreases during discharging (13B). When a volume of the negative electrode 13 changes with charging and discharging, an area of a surface in contact with the separator 11 does not substantially change, and the negative electrode 13 expands or contracts as the thickness changes. That is, the volume of the negative electrode 13 changes according to the thickness.

The negative electrode 13 includes: a second three-dimensional current collector 18 formed of a self-supporting sponge-like structure of second carbon nanotubes (CNT) 17; a negative electrode active material 19 (19A, 19B) as a metal active material contained inside the second three-dimensional current collector 18; and a plurality of seed particles 20 contained inside second three-dimensional current collector 18 and made of a material different from the negative electrode active material 19. The negative electrode active material 19 remains in a discharged state (19B) in FIG. 1, but may not remain in a discharged state.

The sponge-like structure the second three-dimensional current collector 18 is formed by entangling a plurality of second CNTs 17 with each other. The second CNT 17 preferably has a length of 1 μm or more. When the length of the second CNT 17 is 1 μm or more, the plurality of second CNTs 17 are entangled with each other, and the self-supporting of the sponge-lake structure is ensured.

A diameter of each of the second CNT 17 is smaller than a diameter of each of the plurality of seed particles 20. The diameter of the second CNT 17 is preferably 20 nm or less more preferably 15 nm or less, and most preferably 10 nm or less. As the diameter of the second CNT 17 is smaller, the flexibility as a sponge-like structure is improved. Further, as the diameter of the second CNT 17 is smaller, specific surface area of the second CNT 17 is larger, and therefore, the number of seed particles 20 as nuclei for plating of Li, which will be described later, increases.

The specific surface area of the second CNT 17 is 200 $m^2/g$ or more. When the specific surface area of the second CNT 17 is 200 $m^2/g$ or more, the number of seed particles 20 as the nuclei for plating of Li increases, and therefore, the formation of a dendrite is further prevented. The specific surface area of the second CNT 17 is preferably 300 $m^2/g$ or more, and particularly preferably 400 $m^2/g$ or more. Further, when the specific surface area of the second CNT 17 is too large, side reactions such as decomposition reaction of the electrolyte may occur, and therefore, the specific surface area of the second CNT 17 is preferably 1200 $m^2/g$ or less, and particularly preferably 800 $m^2/g$ or less.

The second CNT 17 is carbon nanotubes having an average number of layers of 1 or more and 10 or less. As the average number of layers of the second CNT 17 is smaller, the diameter of the second CNT 17 is smaller, and the plurality of second CNTs 17 are more likely to get entangled with each other, and therefore, the self-supporting of the sponge-like structure is more reliably ensured. Further, as the average number of layers of the second CNT 17 is smaller, the specific surface area of the second CNT 17 is larger, and therefore, the number of seed particles 20 as the nuclei for plating of Li increases. However, when the average number of layers of the second CNT 17 is too small, the specific surface area of the second CNT is too large. The average number of layers of the second CNT 17 is preferably 1 or more and 5 or less, and particularly preferably 2 or more and 5 or less.

The negative electrode active material 19 preferably is made of at least one selected from the group consisting of Li, Na, Mg, Ca, K, Al, and Zn. The material of the negative electrode active material 19 is Li in the present embodiment. In the present embodiment, the negative electrode active material 19 has a particulate structure in which Li is plated around the seed particles 20. The negative electrode active material 19 may be configured such that Li plated around the plurality of seed particles 20 are bonded to each other to fill voids in the sponge-like structure of the second three-dimensional current collector 18.

A value, which is obtained by dividing a mass of the negative electrode active material 19 in a charged state by a mass of the plurality of second CNTs 17 forming the sponge-like structure of the second three-dimensional current collector 18, is preferably 1 or more. By setting the value to 1 or more, a mass ratio and a volume ratio of the second three-dimensional current collector 18 the secondary battery 10 can be reduced, and a gravimetric capacity and a volumetric capacity can be increased. The above value is more preferably 2 or more, and particularly preferably 4 or more.

A value, which is obtained by multiplying the mass of the negative electrode active material 19 in a charged state by a gravimetric capacity of the negative electrode active material, is preferably 5 times or less a design capacity of a pair of positive and negative electrodes in the secondary battery 10. That is, by setting a value obtained by dividing the value, which is obtained by multiplying the mass of the negative electrode active material 19 in the charged state by the gravimetric capacity of the negative electrode active material, by the design capacity of the pair of positive and negative electrodes in the secondary battery 10 ([mass of negative electrode active material 19 in the charged state]× [gravimetric capacity of negative electrode active material]/ [design capacity of pair of positive and negative electrodes in secondary battery 10]), to 5 or less, the negative electrode active material 19 (Li) in the second three-dimensional current collector does not become excessive, and the gravimetric capacity and the volumetric capacity can be increased. The above value is more preferably 3 times or less, and particularly preferably 2 times or less. For example, in a case where the design capacity of the secondary battery is 4 $mAh/cm^2$ per area of a pair of positive and negative electrodes, when metal Li is used at 2 $mg/cm^2$ per area of the negative electrode, 7.72 $mAh/cm^2$ is obtained by multiplying the mass of metal Li per electrode area by the gravimetric capacity 3861 mAh/g of metal Li, and therefore, the above value is 1.93.

The seed particles 20 preferably is made of at least one selected from the group consisting of C, Mg, Al, Si, Sn, Zn, Cu, Ag, Au, and Pt. These materials are a material that reacts with Li (negative electrode active material 19) to form an alloy, a material that forms a compound with Li, or a material that becomes nuclei for plating of Li. For example, Mg, Al, Si, Sn, Ag, Au, and Pt among the above materials form an alloy with Li. C forms a compound with Li. Zn and Cu do not form an alloy with Li, but become nuclei for plating of Li. The seed particles 20 are made of Cu in the present embodiment.

The number of seed particles 20 per electrode area is preferably $1 \times 10^8/cm^2$ or more. Since Li is plated around the seed particles 20, as the number of seed particles 20 per electrode area increases, Li plated around the individual seed particles 20 does not grow significantly, and the formation of the dendrite is prevented. When 4 mAh/cm$^2$ is charged per area of the pair of positive and negative electrodes, metal Li plated on the negative electrode per electrode area has a mass of 1.04 mg/cm$^2$ and a volume of 1.94×10$^{-3}$ cm$^3$/cm$^2$, so that a plating amount of metal Li per seed particle can be reduced to 1.94×10$^{-11}$ cm$^3$ or less, that is, 19.4 μm$^3$ or less. The number of seed particles 20 per electrode area is more preferably 1×10$^{10}$/cm$^2$ or more, and still more preferably 1×10$^{12}$/cm$^2$ or more. This is because the plating amount of metal Li per seed particle can be made smaller, 0.194 μm$^3$ or less, and even smaller, 0.00194 μm$^3$ or less, the formation of the dendrite can be prevented more effectively, and a surface area of metal Li can be increased to reduce an overvoltage.

A value obtained by dividing the mass of the negative electrode active material 19 in a charged state by a mass of the seed particles 20 is preferably 3 or more. By setting the value to 3 or more, a mass ratio and a volume ratio of the negative electrode 13 to the secondary battery 10 can be reduced, and the gravimetric capacity and the volumetric capacity can be increased. The above value is more preferably 10 or more, and particularly preferably 30 or more.

A value obtained by dividing the thickness of the negative electrode 13 in a charged state by the thickness of the negative electrode 13 in a discharged state is preferably 1.15 or more, more preferably 1.5 or more, and particular preferably 2.0 or more. This is because, as shown in Examples later, since a volume change of an active material during charging and discharging is determined by a design capacity of a battery, as the value obtained by dividing the thickness in the charged state by the thickness in the discharged state is larger, the thickness of the negative electrode both in the discharged state and in the charged state is smaller, and a volume of the secondary battery can be reduced. Further, a value obtained by dividing a mass of the negative electrode 13 in the charged state by a mass of the negative electrode 13 in the discharged state is preferably 1.15 or more, more preferably 1.5 or more, and particularly preferably 2.0 or more. This is because, as shown in Examples later, since a mass change of an active material during charging and discharging is determined by design capacity of a battery, as the value obtained by dividing the mass in the charged state by the mass in the discharged state is larger, the mass of the negative electrode in both discharged and charged states is smaller, and the secondary battery can be made lighter.

Since the negative electrode 13 includes the second three-dimensional current collector 18 having a high electric conductivity, the negative electrode 13 does not contain a foil of a metal active material. The inclusion of a foil of a metal active material increases the mass and the volume of the negative electrode, which leads to a decrease in gravimetric capacity and volumetric capacity. Further, when a foil of a metal active material that is in contact with the entire surface of the negative electrode is contained, the foil inhibits the volume change of the negative electrode, and stress is generated between the foil and the negative electrode, which causes deterioration of battery characteristics. It is preferable that the negative electrode 13 does not include a separate current collector foil made of a material different from the metal active material. Further, it is preferable that the positive electrode 12 also does not contain a current collector foil.

2. Manufacturing Method

A method of manufacturing the negative electrode (secondary battery negative electrode) 13 according to the present embodiment will be described. The negative electrode 13 is obtained by compositing the second CNTs 17, the negative electrode active material 19, and the seed particles 20. Hereinafter, an example of the method of manufacturing the negative electrode 13 will be described.

The method of manufacturing the negative electrode 13 includes: a composite film forming step of forming a composite film containing the seed particles 20 in the second three-dimensional current collector 18 formed of the self-supporting sponge-like structure of the second CNTs 17; and a metal active material holding step of holding the negative electrode active material 19 as a metal active material in the composite film.

Figure 2:
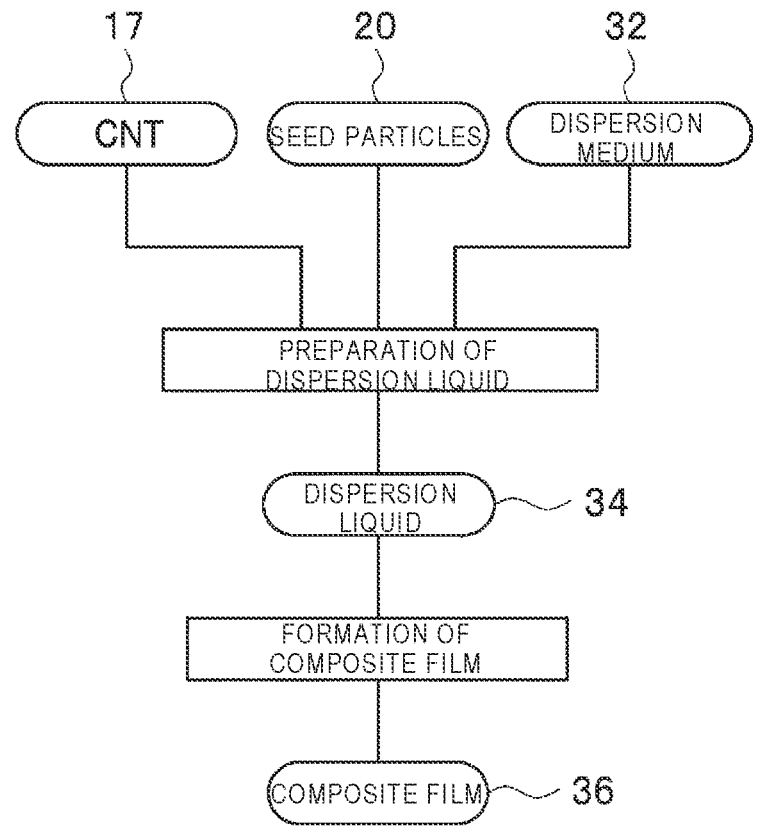
FIG. 2 is a flowchart showing a first example of a composite film forming step in a method of manufacturing a secondary battery negative electrode according to the present embodiment.

A first example of the composite film forming step will be described. As shown in FIG. 2, in the composite film forming step, a dispersion liquid 34 is prepared using the second CNTs 17, the seed particles 20, and a dispersion medium 32, and the dispersion liquid 34 is used to form a composite film 36 containing the seed particles 20 in the second three-dimensional current collector 18.

The second CNTs 17 can be synthesized by a CVD method. Examples include a fluidized-bed CVD method described in Japanese Patent No. 5447367, Japanese Patent No. 5862559, D. Y. Kim, H. Sugime, K. Hasegawa, T. Osawa, and S. Nada, Carbon 49(6), 1972-1979 (2011), Z. Chen, D. Y. Kim, K. Hasegawa, T. Osawa and S. Noda, Carbon 80, 339-350 (2014), or the like. The second CNTs 17 may be synthesized by a floating catalyst CVD method or an on-substrate catalyst CVD method. Accordingly, a long second CNT 17 (diameter: 20 nm or less, length: 1 μm or more) is obtained.

As the seed particles 20, for example, copper particles are used. The copper particles may be synthesized colloid chemically by a wet method or by a dry method such as an in-gas evaporation method. Water, an organic solvent, or the like is used as the dispersion medium 32. The organic solvent is ethanol, isopropanol, or the like. The dispersion liquid 34 is prepared by co-dispersing the second CNTs 17 and the seed particles 20 in the dispersion medium 32. The composite film 36 is formed by removing the dispersion medium 32 from the dispersion liquid 34. The dispersion medium 32 is removed from the dispersion liquid 34, for example, by filtering the dispersion liquid 34 using a filter. In a process of removing the dispersion medium 32 from the dispersion liquid 34, the second CNTs 17 form a network by van der Waals force while incorporating the seed particles 20, and are accumulated on a surface of the filter. Therefore, the seed particles 20 are incorporated into the pores of the second three-dimensional current collector 18 (see FIG. 1) formed of the self-supporting sponge-like structure of the second CNTs 17, and the composite film 36 containing the seed particles 20 in the second three-dimensional current collector 18 is formed. The composite film 36 is separated from the filter and recovered as a self-supporting film. Further, the composite film 36 is dried using a dryer before or after separation from the filter, if necessary. The composite film 36 is annealed after drying. Instead of filtering the dispersion liquid 34 using the filter and drying the dispersion liquid 34, the dispersion liquid 34 may be applied and dried.

Figure 3:
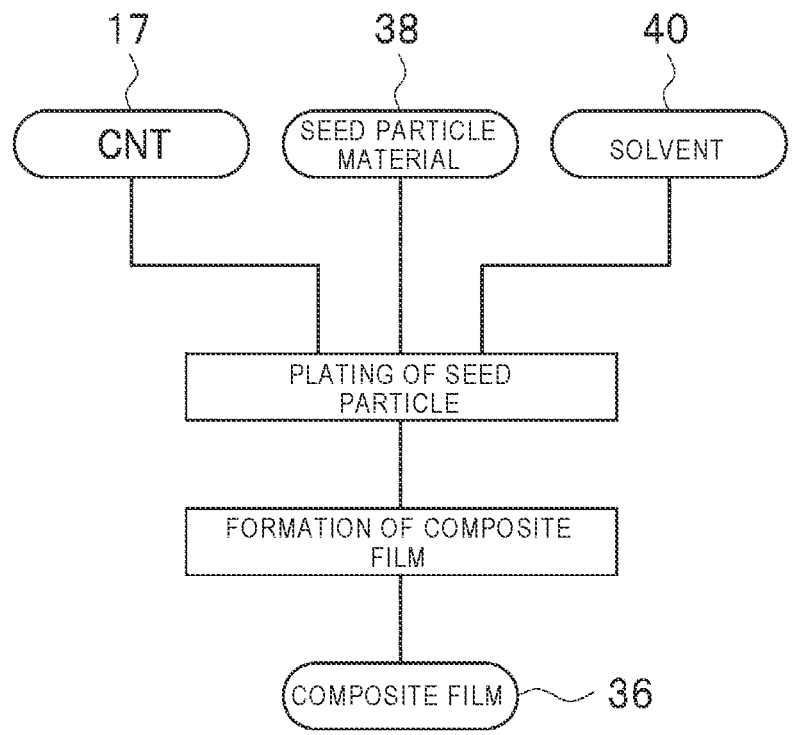
FIG. 3 is a flowchart showing a second example of the composite film forming step.

A second example of the composite film forming step will be described. The case where the seed particles 20 are used is not limited. As shown in FIG. 3, in the composite film forming step, the seed particles 20 may be plated on the second CNTs 17 using a seed particle material 38, and then the composite film 36 may be formed by using the second CNTs 17 on which the seed particles 20 are plated. Specifically, in the composite film forming step, first, the second CNTs 17 and the seed particle material 38 are put into a solvent 40, the second CNTs 17 are dispersed in the solvent 40, and the seed particle material 38 is dissolved in the solvent 40. As the seed particle material 38, for example, copper sulfate, copper hydroxide, and copper acetate are used. Then, a reducing agent (for example, hydrazine, sodium borohydride, and polyvinylpyrrolidone) is added to the solvent 40 containing the second CNTs 17 and the seed particle material 38, and the seed particles 20 are plated on the second CNTs 17 by a chemical reduction method or a photoreduction method. Then, the solvent 40 containing the second CNTs 17 and the seed particle material 38 is filtered by, for example, a filter to form the composite film 36.

Figure 4:
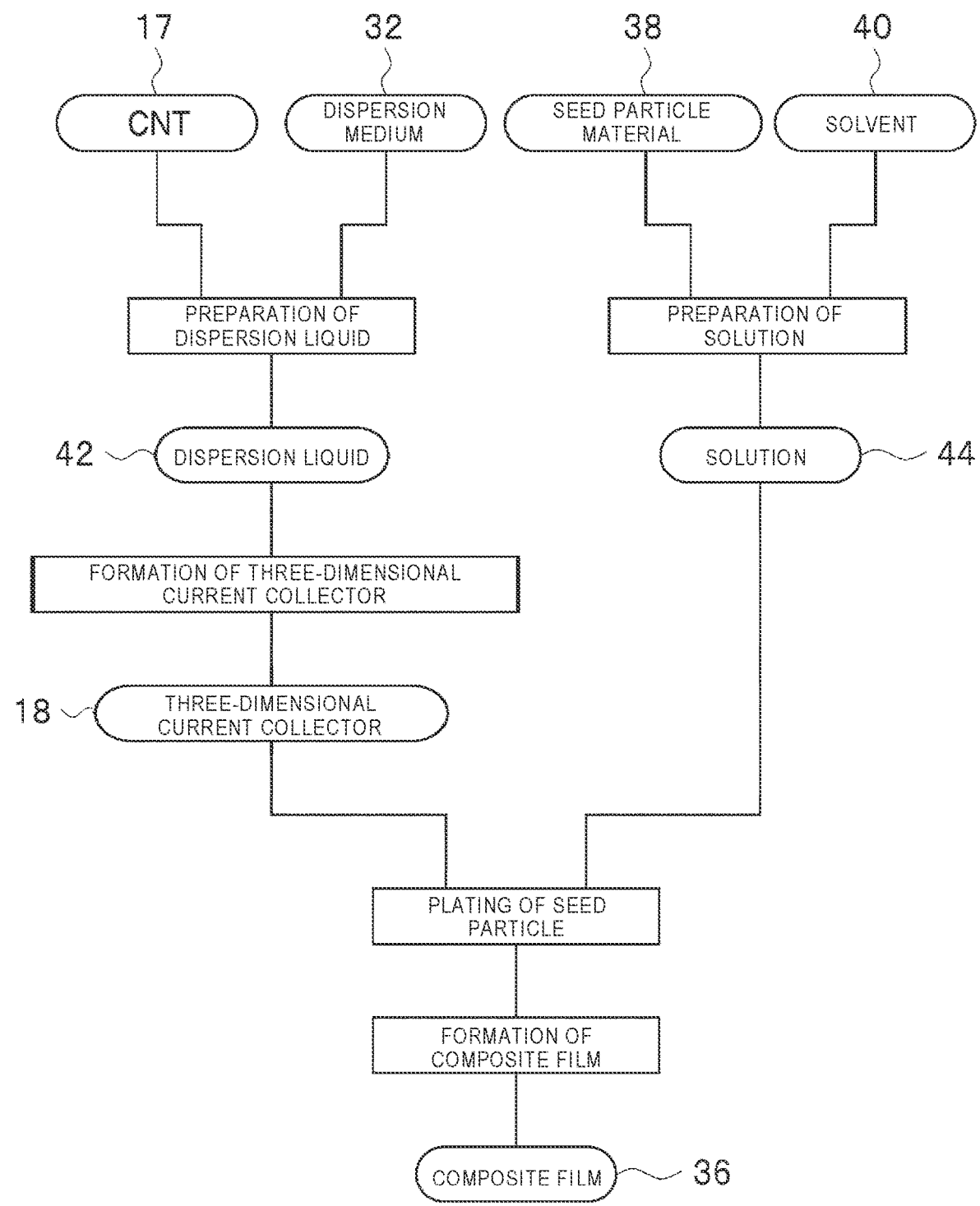
FIG. 4 is a flowchart showing a third example of the composite film forming step.

A third example of the composite film forming step will be described. As shown in FIG. 4, in the composite film forming step, the second three-dimensional current collector 18 may be formed, and then the seed particles 20 may be plated on the second CNTs 17 of the second three-dimensional current collector 18. Specifically, in the composite film forming step, first, a dispersion liquid 42 in which the second CNTs 17 are dispersed in the dispersion medium 32 is prepared, and the second three-dimensional current collector 18 is formed using the dispersion liquid 42. The second three-dimensional current collector 18 is formed by removing the dispersion medium 32 from the dispersion liquid 42. The dispersion medium 32 is removed from the dispersion liquid 42, for example, by filtering the dispersion liquid 42 using a filter. By removing the dispersion medium 32, the second CNTs 17 are accumulated on a surface of the filter, and the second three-dimensional current collector 18 formed of the self-supporting sponge-like structure of the second CNTs 17 is obtained. The second three-dimensional current collector 18 is separated from the filter and recovered as a self-supporting film. Further, in the composite film forming step, a solution 44 in which the seed particle material 38 is dissolved in the solvent 40 is prepared. As the solution 44, for example, a copper sulfate aqueous solution or a copper nitrate ethanol solution can be used. The second three-dimensional current collector 18 is immersed in the solution 44, and when the second three-dimensional current collector 18 is taken out from the solution 44 and then dried, the seed particle material 38 (for example, copper sulfate or copper nitrate) can be held in the second three-dimensional current collector 18. The second three-dimensional current collector 18 holding the seed particle material 38 is annealed (for example, 800° C., 5 minutes) in a reducing atmosphere (for example, a mixed gas of hydrogen and argon), and the seed particles 20 are plated on the second CNTs 17 of the second three-dimensional current collector 18, so as to form the composite film 36. The seed particles 20 may be plated on the second CNTs 17 of the second three-dimensional current collector 18 by immersing the second three-dimensional current collector 18 in the solution 44 and electroplating using the second three-dimensional current collector 18 as an electrode. Then, the second three-dimensional current collector 18 in which the seed particles 20 are plated is taken out from the solution 44 and dried to form the composite film 36.

A first example of the metal active material holding step will be described. In the metal active material holding step, first, a negative electrode precursor (not shown) in which a foil of metal forming the negative electrode active material 19 (Li) is laminated on the composite film 36 is prepared. Next, an electrolyte (not shown) is prepared, and the negative electrode precursor and an electrode (not shown) which is the opposite electrode of the negative electrode precursor are disposed in the electrolyte. Then, charging and discharging is performed using the negative electrode precursor and the electrode. By charging and discharging, in the negative electrode precursor, the negative electrode active material 19 is plated around the seed particles 20 of the composite film 36. That is, the negative electrode active material 19 as a metal active material is held in the composite film 36. As a result, the negative electrode 13 in which the second CNTs 17, the negative electrode active material 19, and the seed particles 20 are composited is obtained.

A second example of the metal active material holding step will be described. In this example, instead of charging and discharging using the negative electrode precursor (not shown), the negative electrode precursor heated to melt the foil of metal forming the negative electrode active material 19 (Li). A heating temperature is, for example, 200° C. The molten metal enters the voids of the second three-dimensional current collector 18 of the negative electrode precursor and becomes the negative electrode active material 19. As a result, the negative electrode 13 in which the second CNTs 17, the negative electrode active material 19, and the seed particles 20 are composited is obtained.

A third example of the metal active material holding step will be described. In this example, instead of using the foil of metal forming the negative electrode active material 19, a positive electrode (not shown) having a positive electrode active material containing metal ions forming the negative electrode active material 19 is used. In the metal active material holding step, first, an electrolyte (not shown) is prepared, and the composite film 36 and the positive electrode are disposed in the electrolyte. Then, by charging using the composite film 36 and the positive electrode, the negative electrode active material 19 is plated around the seed particles 20 of the composite film 36. As a result, the negative electrode 13 in which the second CNTs 17, the negative electrode active material 19, and the seed particles 20 are composited is obtained. As the positive electrode having a positive electrode active material containing metal ions forming the negative electrode active material 19, the negative electrode precursor, which is described in the first example of the metal active material holding step and which the foil of metal forming the negative electrode active material 19 (Li) is laminated on the composite film sue, may be used.

Figure 5:
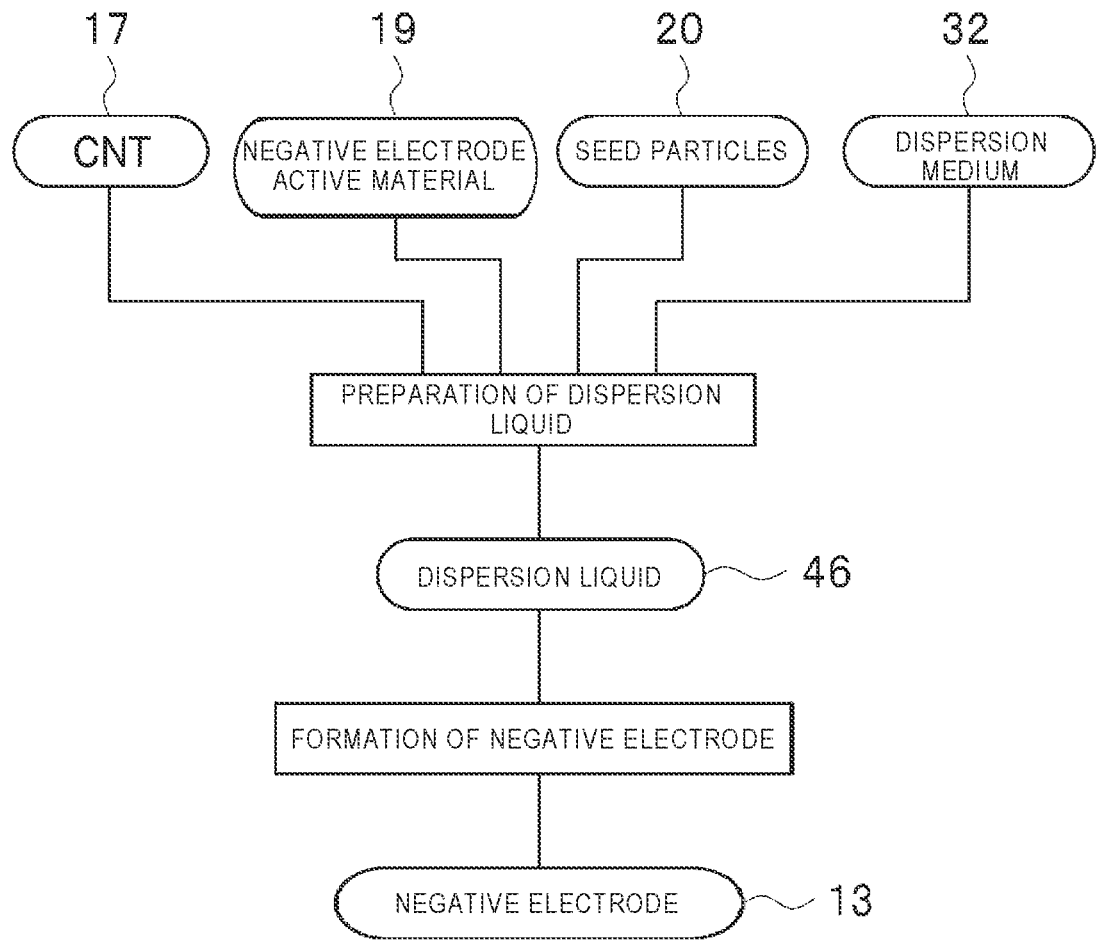
FIG. 5 is a flowchart showing another method of manufacturing a secondary battery negative electrode according to the present embodiment.

Another method of manufacturing the negative electrode 13 will be described. In this example, as shown in FIG. 5, a dispersion liquid 46 is prepared by using the second CNTs 17, particles of the negative electrode active material 19, the seed particles 20, and the dispersion medium 32 without performing the composite film forming step and the metal active material holding step, and the dispersion medium 32 is removed from the dispersion liquid 46, so as to form the negative electrode 13. The dispersion liquid 46 is prepared by co-dispersing the second CNTs 17, the particles of the negative electrode active material 19, and the seed particles 20 in the dispersion medium 32. The dispersion medium 32 is removed from the dispersion liquid 46, for example, by filtering the dispersion liquid 46 using a filter. In a process of removing the dispersion medium 32 from the dispersion liquid 46, the second CNTs 17 form a network by van der Waals force while incorporating the particles of the negative electrode active material 19 and the seed particles 20, and are accumulated on a surface of the filter. The particles of the negative electrode active material 19 and the seed particles 20 are incorporated into the pores of the second three-dimensional current collector 18 (see FIG. 1) formed of the self-supporting sponge-like structure of the second CNTs 17, and the negative electrode 13 containing the particles of the negative electrode active material 19 and the seed particles 20 inside the second three-dimensional current collector 18 is formed. The negative electrode 13 is separated from the filter and recovered as a self-supporting film.

Still anther method of manufacturing the negative electrode 13 will be described. In this example, although not shown, the second CNTs 17 in which the seed particles 20 are plated is prepared, a dispersion liquid is prepared by using the second CNTs 17 in which the seed particles 20 are plated, the particles of the negative electrode active material 19, and a dispersion medium, and the dispersion medium is removed from the dispersion liquid to form the negative electrode 13. A method of plating the seed particles 20 on the second CNTs 17 will be omitted. When the dispersion medium is to be removed, the dispersion liquid is filtered using, for example, a filter. Accordingly, the negative electrode 13 containing the particles of the negative electrode active material 19 and the seed particles 20 inside the second three-dimensional current collector 18 is formed on a surface of the filter. The negative electrode 13 is separated from the filter and recovered us a self-supporting film.

3. Action and Effect

When the negative electrode 13 according to the present embodiment is provided with the plurality of seed particles 20 to be nuclei for plating of Li during charging, the generation of a large dendrite that causes a short circuit between the positive electrode and the negative electrode prevented. Further, since the negative electrode active material 19 as a metal active material is contained inside the second three-dimensional current collector 18, and the foil of the metal active material is not contained, the gravimetric capacity and the volumetric capacity the negative electrode 13 can be increased. Furthermore, when second three-dimensional current collector 18 is formed of the sponge-like structure, the thickness of the negative electrode 13 changes reversibly during charging and discharging, and a space inside the secondary battery 10 can be effectively used to increase the volumetric capacity.

When the plurality of seed particles 20 are contained inside the second three-dimensional current collector 18 of the negative electrode 13, the overvoltage of the secondary battery 10 can be reduced. During charging, the plurality of seed particles 20 become nuclei for plating and Li is plated, and therefore, Li is introduced to the negative electrode 13 near a reduction potential of Li$^+$ ions, and the overvoltage is reduced. Further, since Li is plated around the plurality or seed particles 20, a surface area of Li is increased, so that a reduction rate of Li$^+$ per surface area of Li can be reduced, and a reaction overvoltage is reduced. By preventing the overvoltage to a low level, it is possible to prevent the plating of Li from materials other than the seed particles and to prevent the generation of the dendrite.

Since the diameter of the second CNT 17 is smaller than the diameter of the seed particle 20, the negative electrode 13 has excellent flexibility as the sponge-like structure, and the thickness of the negative electrode 13 changes reversibly during charging and discharging. Since the negative electrode 13 does not contain the foil of the metal active material, the change in the thickness (change in the volume) during charging and discharging is not limited.

When the diameter of the second CNT 17 is 20 nm or less, and the specific surface area of the second CNT 17 is 200 m$^2$/g or more, the negative electrode 13 more excellent in flexibility as the sponge-like structure, and the number of the seed particles 20 as nuclei for plating increased. Therefore, the formation of the dendrite is reliability prevented.

When the average number of layers of the second CNT 17 is 1 or more and 10 or less, the plurality of second CNTs 17 are likely to be entangled with each other. Therefore, the sell-supporting property the negative electrode 13 as the sponge-like structure is more reliably ensured.

When the number of seed particles 20 per electrode area of the negative electrode 13 is $1 \times 10^8$/cm$^2$ or more, Li plated around the individual seed particles 20 does not grow significantly, and therefore, the formation of the dendrite is more reliably prevented.

When the thickness of the negative electrode 13 changes reversibly with charging and discharging, the thickness increases during charging, the thickness decreases during discharging, and a value obtained by dividing the thickness in a charged state the thickness in a discharged state is 1.15 or more, the volumetric capacity can be increased by effectively using the space in the secondary battery 10.

4. Modification

The invention is not limited to the above embodiment, and can be appropriately modified within the scope of the gist of the invention.

For example, the negative electrode 13 can be applied to a secondary battery using a highly concentrated aqueous electrolyte instead of an organic electrolyte, an all-solid-state battery using a solid electrolyte instead of an electrolyte, or an air-metal secondary battery using oxygen gas in air as a positive electrode active material. In particular, when the negative electrode 13 is applied to the all-solid-state battery, since the negative electrode 13 contains the plurality of seed particles 20 to be nuclei for plating of Li, an interface with the solid electrolyte can be increased, Li is easily introduced to the negative electrode 13, and the generation of the dendrite is reliability prevented.

5. EXAMPLES 5-1. Calculation of Gravimetric Capacity and Volumetric Capacity

Tables 1 and 2 below summarize configurations of negative electrodes of Examples. The numerical values in the tables were obtained according to a predetermined calculation formula by setting conditions as described later.

TABLE 1

|  | Example | | | | | | |
| --- | --- | --- | --- | --- | --- | --- | --- |
|  | 1 | 2 | 3 | 4 | 5 | 6 | 3 |
| (a) Li metal mass/CNT mass | 1 | 2 | 4 | 8 | 4 | 4 | 4 |
| (b) negative electrode capacity/negative electrode design capacity | 2 | 2 | 2 | 2 | 5 | 3 | 2 |
| (c) Li metal mass/Cu seed mass | 10 | 10 | 10 | 10 | 10 | 10 | 10 |
| (d) Li metal mass (mg/cm$^2$) in charged state | 2.072 | 2.072 | 2.072 | 2.072 | 5.180 | 3.108 | 2.072 |
| (e) Li metal mass (mg/cm$^2$) in discharged state | 1.036 | 1.036 | 1.036 | 1.036 | 4.144 | 2.072 | 1.036 |
| (f) CNT mass (mg/cm$^2$) | 2.072 | 1.036 | 0.518 | 0.259 | 1.295 | 0.777 | 0.518 |

TABLE 1-continued

| | | | | | | | | |
|---|---|---|---|---|---|---|---|---|
| (g) Cu seed mass (mg/cm$^2$) | 0.207 | 0.207 | 0.207 | 0.207 | 0.518 | 0.311 | 0.207 |
| (h) total mass (mg/cm$^2$) (d + f + g) in charged state | 4.351 | 3.315 | 2.797 | 2.538 | 6.992 | 4.195 | 2.797 |
| (i) total mass (mg/cm$^2$) (e + f + g) in discharged state | 3.315 | 2.279 | 1.761 | 1.502 | 5.957 | 3.16 | 1.761 |
| (j) mass ratio (h/i) in charged/discharged state | 1.31 | 1.45 | 1.59 | 1.69 | 1.17 | 1.33 | 1.59 |
| (k) gravimetric capacity (mAh/g) (4/h × 1000) | 919 | 1207 | 1430 | 1576 | 572 | 953 | 1430 |

| | Example | | | | |
|---|---|---|---|---|---|
| | 7 | 8 | 9 | 3 | 10 |
| (a) Li metal mass/CNT mass | 4 | 4 | 4 | 4 | 4 |
| (b) negative electrode capacity/negative electrode design capacity | 1 | 2 | 2 | 2 | 2 |
| (c) Li metal mass/Cu seed mass | 10 | 1 | 3 | 10 | 30 |
| (d) Li metal mass (mg/cm$^2$) in charged state | 1.036 | 2.072 | 2.072 | 2.072 | 2.072 |
| (e) Li metal mass (mg/cm$^2$) in discharged state | 0 | 1.036 | 1.036 | 1.036 | 1.036 |
| (f) CNT mass (mg/cm$^2$) | 0.259 | 0.518 | 0.518 | 0.518 | 0.518 |
| (g) Cu seed mass (mg/cm$^2$) | 0.104 | 2.072 | 0.691 | 0.207 | 0.069 |
| (h) total mass (mg/cm$^2$) (d + f + g) in charged state | 1.398 | 4.662 | 3.28 | 2.797 | 2.659 |
| (i) total mass (mg/cm$^2$) (e + f + g) in discharged state | 0.363 | 3.626 | 2.245 | 1.761 | 1.623 |
| (j) mass ratio (h/i) in charged/discharged state | 3.85 | 1.29 | 1.46 | 1.59 | 1.64 |
| (k) gravimetric capacity (mAh/g) (4/h × 1000) | 2860 | 858 | 1219 | 1430 | 1504 |

TABLE 2

| | Example | | | | | |
|---|---|---|---|---|---|---|
| | 1 | 2 | 3 | 4 | 5 | 6 |
| (a) Li metal mass/CNT mass | 1 | 2 | 4 | 8 | 4 | 4 |
| (b) negative electrode capacity/negative electrode design capacity | 2 | 2 | 2 | 2 | 5 | 3 |
| (c) Li metal mass/Cu seed mass | 10 | 10 | 10 | 10 | 10 | 10 |
| (d') Li metal volume (cm$^3$/cm$^2$) in charged state | 3.88E−03 | 3.88E−03 | 3.88E−03 | 3.88E−03 | 9.70E−03 | 5.82E−03 |
| (e') Li metal volume (cm$^3$/cm$^2$) in discharged state | 1.94E−03 | 1.94E−03 | 1.94E−03 | 1.94E−03 | 7.76E−03 | 3.88E−03 |
| (f') CNT volume (cm$^3$/cm$^2$) | 1.38E−03 | 6.91E−04 | 3.45E−04 | 1.73E−04 | 8.63E−04 | 5.18E−04 |
| (g') Cu seed volume (cm$^3$/cm$^2$) | 2.31E−05 | 2.31E−05 | 2.31E−05 | 2.31E−05 | 5.78E−05 | 3.47E−05 |
| (l) porosity | 0.3 | 0.3 | 0.3 | 0.3 | 0.3 | 0.3 |
| (m) total volume (cm$^3$/cm$^2$) ([d' + f' + g']/(1 − I) in charged state | 7.55E−03 | 6.56E−03 | 6.07E−03 | 5.82E−03 | 1.52E−02 | 9.10E−03 |
| (n) total volume (cm$^3$/cm$^2$) ([e' + f' + g']/(1 − I) in discharged state | 4.78E−03 | 3.79E−03 | 3.30E−03 | 3.05E−03 | 1.24E−02 | 6.33E−03 |
| (o) thickness ratio (m/n) in charged/discharged state | 1.58 | 1.73 | 1.84 | 1.91 | 1.22 | 1.44 |
| (p) volumetric capacity (mAh/cm$^3$) (4/d' × 1000) | 530 | 610 | 659 | 687 | 264 | 439 |

| | Example | | | | | |
|---|---|---|---|---|---|---|
| | 3 | 7 | 8 | 9 | 3 | 10 |
| (a) Li metal mass/CNT mass | 4 | 4 | 4 | 4 | 4 | 4 |
| (b) negative electrode capacity/negative electrode design capacity | 2 | 1 | 2 | 2 | 2 | 2 |
| (c) Li metal mass/Cu seed mass | 10 | 10 | 1 | 3 | 10 | 30 |
| (d') Li metal volume (cm$^3$/cm$^2$) in charged state | 3.88E−03 | 1.94E−03 | 3.88E−03 | 3.88E−03 | 3.88E−03 | 3.88E−03 |
| (e') Li metal volume (cm$^3$/cm$^2$) in discharged state | 1.94E−03 | 0.00E+00 | 1.94E−03 | 1.94E−03 | 1.94E−03 | 1.94E−03 |
| (f') CNT volume (cm$^3$/cm$^2$) | 3.45E−04 | 1.73E−04 | 3.45E−04 | 3.45E−04 | 3.45E−04 | 3.45E−04 |
| (g') Cu seed volume (cm$^3$/cm$^2$) | 2.31E−05 | 1.16E−05 | 2.31E−04 | 7.71E−05 | 2.31E−05 | 7.71E−06 |
| (l) porosity | 0.3 | 0.3 | 0.3 | 0.3 | 0.3 | 0.3 |
| (m) total volume (cm$^3$/cm$^2$) ([d' + f' + g']/(1 − I) in charged state | 6.07E−03 | 3.03E−03 | 6.73E−03 | 6.15E−03 | 6.07E−03 | 6.05E−03 |
| (n) total volume (cm$^3$/cm$^2$) ([e' + f' + g']/(1 − I) in discharged state | 3.30E−03 | 2.64E−04 | 3.59E−03 | 3.37E−03 | 3.30E−03 | 3.28E−03 |
| (o) thickness ratio (m/n) in charged/discharged state | 1.84 | 11.51 | 1.77 | 1.82 | 1.84 | 1.85 |
| (p) volumetric capacity (mAh/cm$^3$) (4/d' × 1000) | 659 | 1318 | 628 | 651 | 659 | 661 |

For the negative electrodes of Examples 1 to 10, the material of the negative electrode active material 19 was Li, and the material of the seed particles 20 was Cu. For the negative electrodes of Examples 1 to 10, it was assumed that a negative electrode design capacity per electrode area was 4 mAh/cm$^2$. When the design capacity is to be multiplied by n, a mass and a thickness of the used material and electrode may be multiplied by n. Examples 1 to 4 are negative electrodes in which a ratio of a Li metal mass to a CNT mass (metal mass/CNT mass) is changed. Examples 5, 6, 3 and 7 are negative electrodes in which a ratio of a negative electrode capacity to a negative electrode design capacity (negative electrode capacity/negative electrode design capacity) is changed. Examples 8, 9, and 10 are negative electrodes in which a ratio of a Li metal mass to a Cu seed particle mass (Li metal mass/Cu seed mass) is changed.

Table 1 shows results of calculating the mass ratio in charged/discharged state (j) and the gravimetric capacity of the negative electrodes of Examples 1 to 10.

The Li metal mass/CNT mass (a) in Table 1 is a value obtained by dividing the Li metal mass in a charged state by the mass of CNTs forming three-dimensional current collector. In Examples 1 to 4, the value was changed from 1 to 8, and in Examples 5 to 10, the value was set to 4. The negative electrode capacity/negative electrode design capacity (b) is a value obtained by dividing the negative electrode capacity in the charged state by the assumed negative electrode design capacity (4 mAh/cm$^2$). In Examples 5, 6, 3 and 7, the value was changed from 5 to 1, and in Examples 1 to 4 and 8 to 10, the value was set to 2. The Li metal mass/Cu seed mass (c) is a value obtained by dividing the Li metal mass in the charged state by the Cu seed particle mass. In Examples 8, 9, 3, and 10, the value was changed from 1 to 30, and in Examples 1, 2, and 4 to 7, the value was set to 10.

The method of calculating the mass ratio in charge/discharged state (j) and the gravimetric capacity (k) will be described below.

The Li metal mass in a charged state (d) is the Li metal mass calculated using a charge amount which is obtained based on the negative electrode design capacity per electrode area (4 mAh/cm$^2$), and an atomic weight of Li. The Li metal mass in a discharged state (e) was calculated on the assumption that a fraction (negative electrode capacity/negative electrode design capacity (b)−1)/(negative electrode capacity/negative electrode design capacity (b)) of the Li metal mass in the charged state (d) remains on the negative electrode in the discharged state. The CNT mass (f) was calculated by dividing the Li metal mass in the charged state (d) by the Li metal mass/CNT mass (a). The Cu seed mass (g) was calculated by dividing the Li metal mass in the charged state (d) by the Li metal mass/Cu seed mass (c). The total mass in the charged state (h) is a total value of the Li metal mass in the charged state (d), the CNT mass (f), and the Cu seed mass (g). The total mass in the discharged state (i) is a total value of the Li metal mass in the discharged state (e), the CNT mass (f), and the Cu seed mass (g).

The mass ratio in charged/discharged state (j) was calculated by dividing the total mass in a charged state (h) by the total mass in a discharged state (i). The gravimetric capacity (k) was calculated by dividing the negative electrode design capacity per electrode area (4 mAh/cm$^2$) by the total mass in the charged state (h).

From Table 1, it can be seen that the mass ratio in charged/discharged state (j) and the gravimetric capacity (k) increase as the Li metal mass/CNT mass (a) increases when Examples 1 to 4 in which the Li metal mass/CNT mass (a) is changed from 1 to 8 are compared. In addition, it can be seen that the mass ratio in charged/discharged state (j) and the gravimetric capacity (k) increase as the negative electrode capacity/negative electrode design capacity (b) decreases when Examples 5, 6, 3, and 7 in which the negative electrode capacity/negative electrode design capacity (b) is changed from 5 to 1 are compared. Further, it can be seen that the mass ratio in charged/discharged state (j) and the gravimetric capacity (k) increase as the metal mass/Cu seed mass (c) increases when Examples 8, 9, 3, and 10 in which the Li metal mass/Cu seed mass (c) is changed from 1 to 30 are compared. Furthermore, it can be seen that as the mass ratio in charged/discharged state is larger, the mass of the negative electrode is smaller in both charged and discharge states, and the gravimetric capacity is larger. The mass ratio in charged/discharged state (j) is preferably 1.15 or more, more preferably 1.5 or more, and particularly preferably 2.0 or more.

Table 2 shows results of calculating the thickness ratio in charged/discharged state (o) and the volumetric capacity (p) of the negative electrodes of Examples 1 to 10.

The method of calculating the thickness ratio in charged/discharged state (o) and the volumetric capacity (p) will be described below.

The Li metal volume in a charged state (d') in Table 2 was obtained by converting the Li metal mass in the charged state (d) by the density of Li. The Li metal volume in a discharged state (e') was calculated on the assumption that a fraction (negative electrode capacity/negative electrode design capacity (b)−1)/(negative electrode capacity/negative electrode design capacity (b)) of the Li metal volume in the charged state (d') remains on the negative electrode in the discharged state. The CNT volume (f') was obtained by converting the CNT mass (f) by the density of CNT. The Cu seed volume (g') was obtained by converting the Cu seed mass (g) by the density of Cu. The porosity (l) is a porosity of the negative electrode, and was set to 0.3 for the negative electrodes of Examples 1 to 10. The total volume in the charged state (m) was calculated by dividing the total value of the Li metal volume in the charged state (d'), the CNT volume (f'), and the Cu seed volume (g') by (1−porosity (l)). The total volume in the discharged state (n) was calculated by dividing the total value of the Li metal volume in the discharged state (e'), the CNT volume (f'), and the Cu seed volume (g') by (1−porosity (l)).

The thickness ratio in charged/discharged state (o) was calculated by dividing the total volume in a charged state (m) by the total volume in a discharged state (n). The volumetric capacity (p) was calculated by dividing the negative electrode design capacity per electrode area (4 mAh/cm$^2$) the Li metal volume in the charged state (d').

From Table 2, it can be seen that the thickness ratio in charged/discharged state (o) and the volumetric capacity (p) increase as the Li metal mass/CNT mass (a) increases when Examples 1 to 4 in which the Li metal mass/CNT mass (a) is changed from 1 to 8 are compared. In addition, it can be seen that the thickness ratio in charged/discharged state (o) and the volumetric capacity (p) increase as the negative electrode capacity/negative electrode design capacity (o) decreases when Examples 5, 6, 3, and 7 in which the negative electrode capacity/negative electrode design capacity (b) is changed from 5 to 1 are compared. Further, it can be seen that the thickness ratio in charged/discharged state (o) and the volumetric capacity (p) increase as the Li metal mass/Cu seed mass (c) increases when Examples 8, 9, 3, and 10 in which the Li metal mass/Cu seed mass (c) is changed from 1 to 30 are compared. Furthermore, it can be seen that as the thickness ratio in charged/discharged state (o) is larger, the volume of the negative electrode is smaller in both charged and discharged states, and the volumetric capacity is larger. The thickness ratio in charged/discharged state (o) is preferably 1.15 or more, more preferably 1.5 or more, and particularly preferably 2.0 or more.

5-2. Experiment for Confirming that Negative Electrode does not Contain Foil of Metal Active Material It was confirmed that when the negative electrode 13 was manufactured using the negative electrode precursor in which the foil of metal forming the negative electrode active material 19 (Li) was laminated on the composite film 36, which was described in the first example of the metal active material holding step and the third example of the metal active material holding step, a negative electrode not containing the metal foil was obtained. Two types of test cells were prepared for carrying out the experiment, and the test cells were designated as Examples 11 and 12.

Hereinafter, Example 11 will be described. First, a composite film was formed by the method described in the first example of the composite film forming step. The second CNTs 17 are CNTs each having a diameter of 20 nm or less, a length of 1 μm or more, and an average number of layers of 1 or more and 5 or less. The seed articles 20 are copper particles each having a diameter of about 25 nm. Isopropanol was used as the dispersion medium 32. The composite film was formed by being dried in a 393K vacuum dryer for 2 hours. The composite film had a diameter of 12 mm, a mass density of Cu per unit area of about 0.12 mg/cm$^2$, and a mass density of CNT per unit area of about 0.78 mg/cm$^2$. In the experiment, two composite films are prepared and used for electrodes of a laminate described later.

Figure 6:
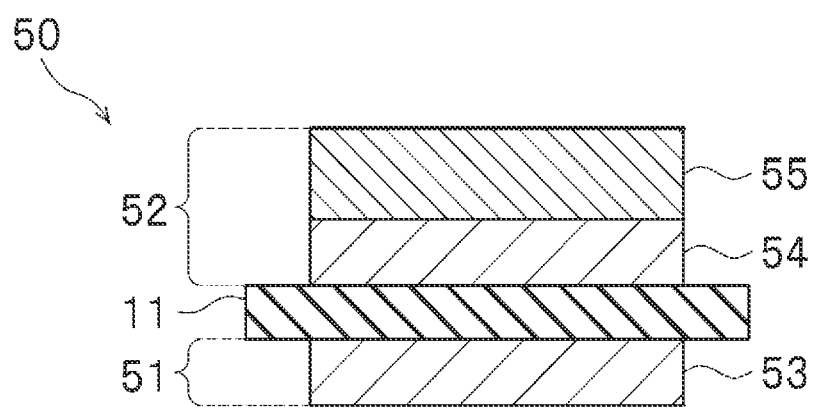
FIG. 6 is a schematic view of a laminate according to Example 11.
Figure 7:
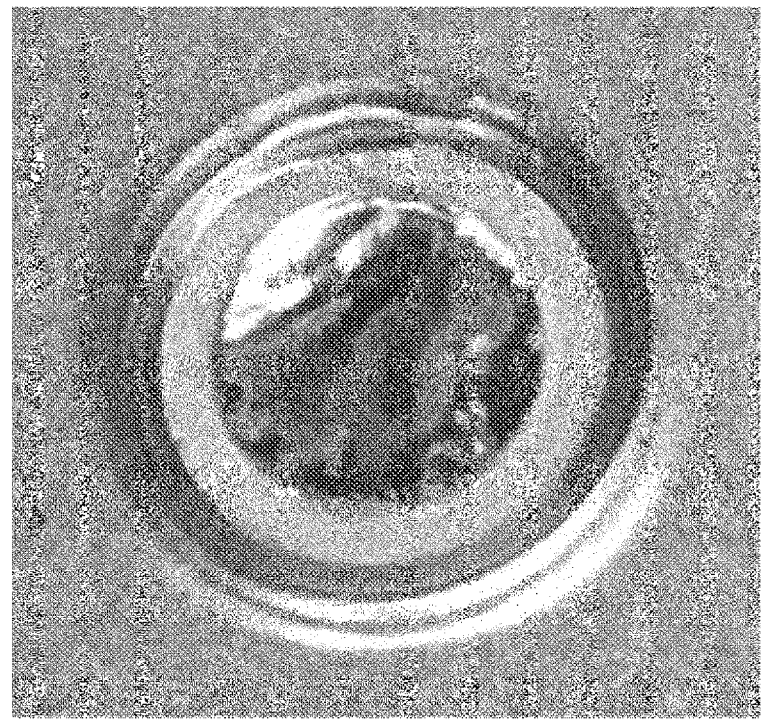
FIG. 7 is a photograph of an upper surface of the laminate according to Example 11.

Next, a laminate 50 shown in FIG. 6 was prepared. The laminate 50 was prepared by laminating a first electrode 51, the separator 11, and a second electrode 52 in this order. The first electrode 51 is formed of a composite film 53. The second electrode 52 is formed of a composite film 54 and a metal foil 55 (a foil of a metal active material), which is laminated on the composite film 54 and forms the negative electrode active material 19 (Li). The first electrode 51 and the second electrode 52 each include the second three-dimensional current collector 18 formed of the self-supporting sponge-like structure of the second CNTs 17 and the plurality of seed particles 20 contained inside the second three-dimensional current collector 18, which are not shown in FIG. 6. The metal foil 55 is a foil having a thickness of 50 μm and a diameter of 12 mm. The separator 11 is made of polyproplene. A photograph of an upper surface (the metal foil 55) of the laminate 50 is shown in FIG. 7. From FIG. 7, the metallic luster of the metal foil 55 was confirmed. The laminate 50 and the electrolyte were housed in a container to prepare the test cell of Example 11.

Figure 8:
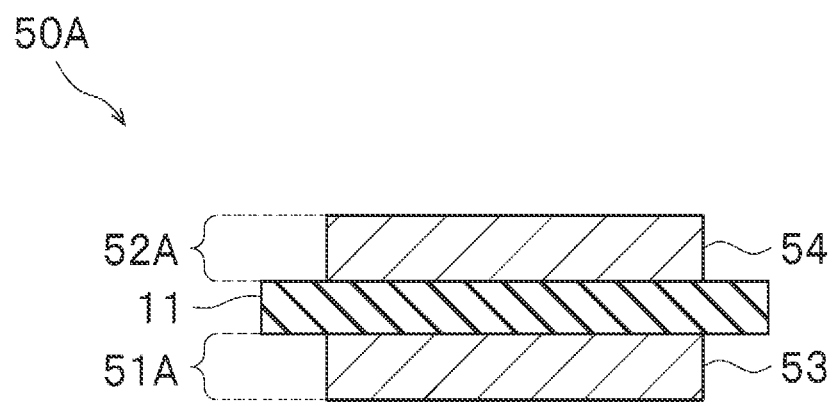
FIG. 8 is a schematic view of a laminate after electrochemically holding a metal active material on a first electrode in a test cell according to Example 11.

Next, in the test cell of Example 11, the metal active material was held by plating Li on the first electrode. The plating of Li was performed at a constant current with a current density of 0.4 mA/cm$^2$, and a cutoff voltage was 0.1 V. In the following description, plating Li on the first electrode to introduce Li is called charging, and stripping Li on the first electrode to release Li from the first electrode is called discharging. Li in the metal foil 55 contained in the second electrode 52 was stripped by charging, Li ions moved to the first electrode 51, and Li was plated around the seed particles 20 contained inside the composite film 53. In the example, Li corresponding to a capacity of 8.86 mAh/cm$^2$ was introduced to the first electrode. As shown in FIG. 8, no metal foil 55 remains in the laminate 50 after charging. In FIG. 8, reference numeral 50A indicates a laminate after charging, reference numeral 51A indicates a first electrode after charging, and reference numeral 52A indicates a second electrode after charging.

Figure 9:
FIG. 9 is a photograph of an upper surface of the first electrode after electrochemically holding the metal active material on the first electrode in the test cell according to Example 11.
Figure 10:
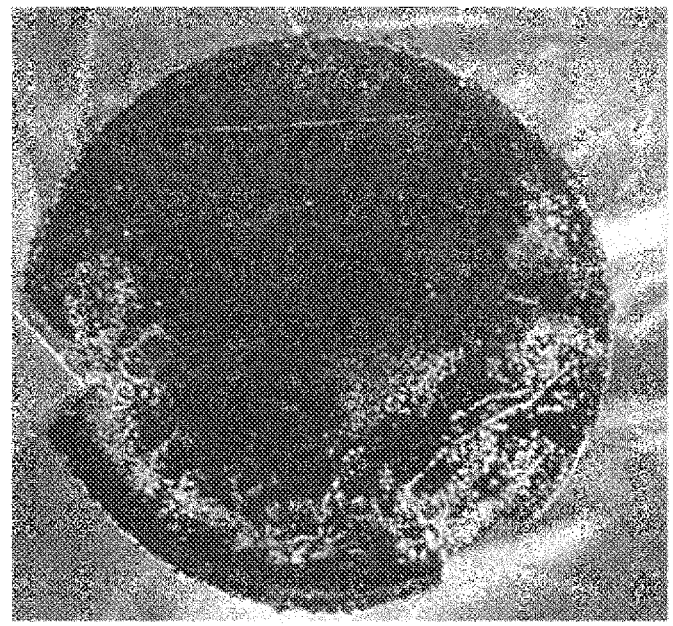
FIG. 10 is a photograph of a lower surface of a second electrode after electrochemically holding the metal active material on the first electrode in the test cell according to Example 11.
Figure 11:
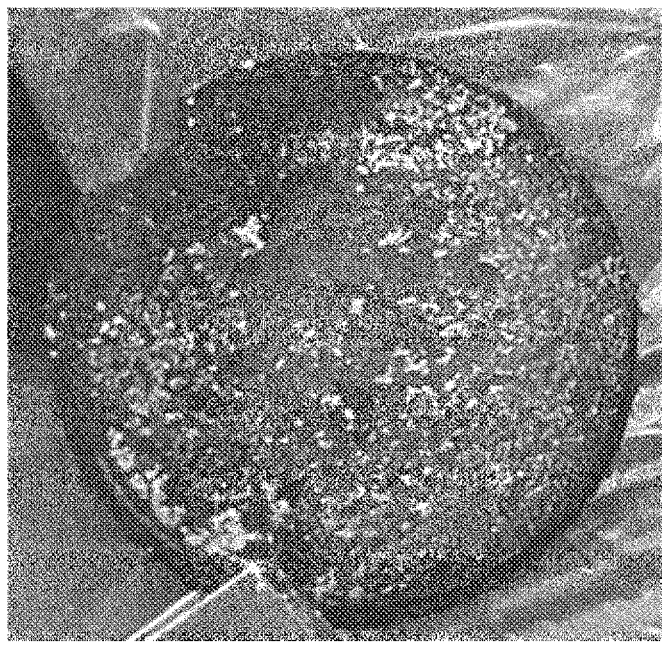
FIG. 11 is a photograph of an upper surface of the second electrode after electrochemically holding the metal active material on the first electrode in the test cell according to Example 11.

The test cell was actually disassembled, and it was visually confirmed that no metal foil 55 remained. FIG. 9 shows a photograph of an upper surface (a surface in contact with the separator 11) of the first electrode 51A after charging. FIG. 10 shows a photograph of a lower surface (a surface in contact with the separator 11) of the second electrode 52A after charging. FIG. 11 shows a photograph of an upper surface (a surface in contact with the metal foil 55) of the second electrode 52A after charging. From FIG. 9, it was confirmed that the composite film 53, which was black before charging, became white without a metallic luster. Li, which is the negative electrode active material 19, is plated around the seed particles 20 contained inside the composite film 53, and therefore, the first electrode 51A is observed to be white without a metallic luster. From FIG. 10, it was confirmed that the lower surface of the second electrode 52A was almost black and Li was almost absent. From FIG. 11, it was confirmed that the upper surface of the second electrode 52A was almost black, no Li foil remained, and Li was almost absent. As described above, it was confirmed that neither the first electrode 51A nor the second electrode 52A had a foil of a metal active material or a film having a metallic luster. Therefore, it was possible to obtain an electrode not containing a foil of a metal active material.

Figure 12:
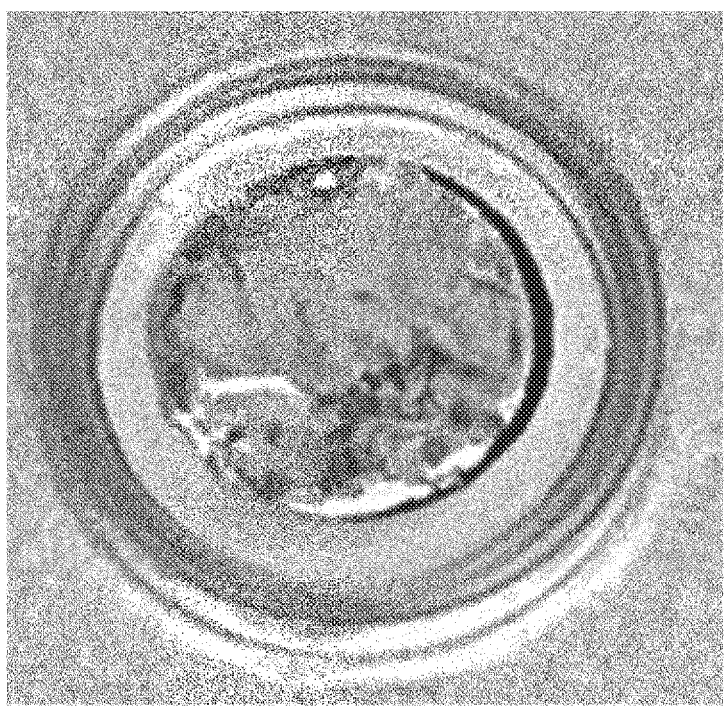
FIG. 12 is a photograph of an upper surface of a laminate according to Example 12.

Hereinafter, Example 12 will be described. First, a composite film according to Example 12 was formed by the same method as in Example 11, that is, the method described in the first example of the composite film forming step. The composite film according to Example 12 is different from the composite film according to Example 11 in that the mass density CNT per unit area is about 0.28 mg/cm$^2$. Next, a laminate according to Example 12 was prepared the same method as in Example 11. FIG. 12 shows a photograph of an upper surface (metal foil) of the laminate according to Example 12. From FIG. 12, the metallic luster of the metal foil was confirmed. The laminate and the electrolyte were housed in a container to prepare the test cell of Example 12.

Next, in the test cell of Example 12, the metal active material was held by plating Li on the first electrode. Similar to Example 11, the plating of was performed at a constant current with a current density of 0.4 mA/cm$^2$, and a cutoff age was 0.1 V. Li in the metal foil contained in the second electrode was stripped by charging, Li ions moved to the first electrode, and Li was plated around the seed particles contained inside the composite film. In the example, Li corresponding to a capacity of 9.13 mAh/cm$^2$ was introduced to the first electrode.

Figure 13:
FIG. 13 is a photograph of an upper surface first electrode after electrochemically holding a metal active material on the first electrode in a test cell according to Example 12.
Figure 14:
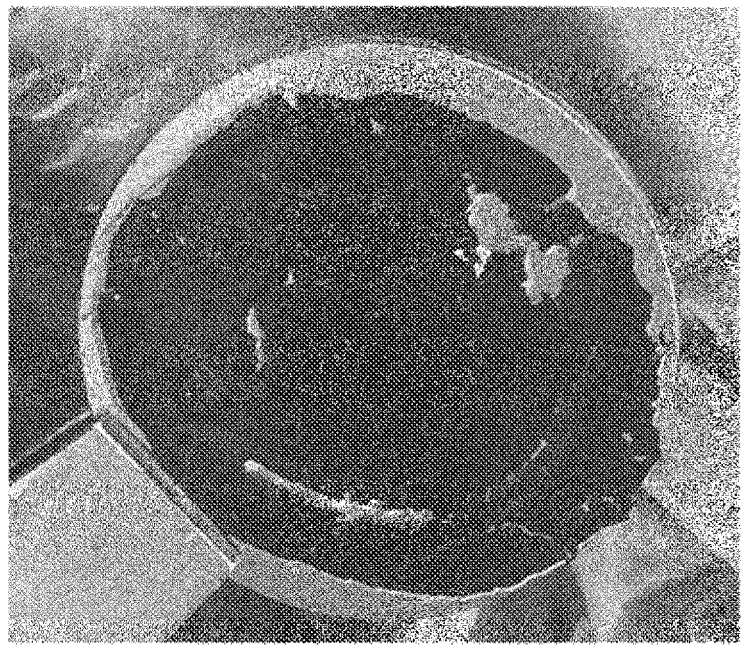
FIG. 14 is a photograph of a lower surface of a second electrode after electrochemically holding the metal active material on the first electrode in the test cell according to Example 12.

The test cell of Example 12 was actually disassembled, and it was visually confirmed that no metal foil remained. FIG. 13 shows photograph of an upper surface (the surface in contact with the separator) of the first electrode after charging. FIG. 14 snows a photograph of a lower surface (the surface in contact with the separator) of the second electrode after charging. From FIG. 13, it was confirmed that the composite film, which was black before charging, became white without: a metallic luster. Li, which is the negative electrode active material, is plated around the seed particles contained inside the composite film, and therefore, the first electrode is observed to be white without a metallic luster. From FIG. 14, it was confirmed that the lower surface of the second electrode was almost black and Li was almost absent. Li was almost absent on the upper surface (the surface in contact with the metal foil) of the second electrode after charging. As described above, it was confirmed that neither the first electrode nor the second electrode had a foil of a metal active material or a film having a metallic luster. Therefore, it was possible to obtain an electrode not containing a foil of a metal active material.

5-3. Cycle Test

A test cell was prepared in the same method as in Example 12, and the prepared test cell was designated as Example 13. The test cell of Example 13 has the same configuration as the test cell of Example 12. Charging in the first cycle was performed at a constant current with a current density of 0.4 mA/cm$^2$, and a cutoff voltage was 0.1 V as in Examples 11 and 12. Metal Li having a thickness of 50 μm and a diameter of 12 mm corresponds to a capacity of about 10 mAh/cm$^2$. Since a part of Li was consumed for the formation of a solid electrolyte interphase (SEI) film during initial charging, Li corresponding to a capacity of about 8.8 mAh/cm² was introduced to the first electrode. Discharging in the first cycle was also performed at a constant current with a current density of 0.4 mA/cm². The discharging the first cycle was stopped in a state where Li, corresponding to a capacity of about 2.4 mAh/cm², remained on the first electrode. Accordingly, Li corresponding to a capacity of about 6.4 mAh/cm² was introduced to the second electrode. Charging and discharging in the second and subsequent cycles were repeated under constant current conditions, that is, the current density was 0.4 mAh/cm² and the cutoff voltage was 0.1 V for the second to fourth cycles and the current density was 1.0 mA/cm² and the cutoff voltage was 0.3 V for the fifth and subsequent cycles, such that the amount of Li moving between the first electrode and the second electrode corresponded to a capacity of about 4 mAh/cm².

A test cell including a laminate, in which a first Cu foil (corresponding to the first electrode), a separator, a metal foil, and a second Cu foil were laminated in this order, was prepared, and the prepared test cell was designated as Comparative Example 1. The first Cu foil and the second Cu foil used in the test cell of Comparative Example 1 are foils each having a thickness of 20 μm and a diameter of 12 mm. The metal foil used in the test cell of Comparative Example 1 has the same configuration as the metal foil used in the test cell of Example 13. A test cell including laminate, in which a first electrode formed of a self-supporting sponge-like structure of CNTs, a separator, and a second electrode formed of a self-supporting sponge-like structure of CNTs and a metal foil were laminated in this order, was prepared, and the prepared test cell was designated as Comparative Example 2. The test cell of Comparative Example 2 is different from the test cell of Example 13 in that the first electrode and the second electrode do not contain seed particles. A test cell including a laminate, in which a first electrode formed of a composite film, a separator, and a second electrode formed of a composite film and a metal foil having thickness of 500 μm were laminated in this order, was prepared, and the prepared test cell was designated as Comparative Example 3. The thickness of the metal foil of the test cell of Comparative Example 3 is different from that of the test cell of Example 13. A cycle test was performed on each of the test cells of Comparative Examples 1 and 2. The cycle test of the test cell of Comparative Example 1 was performed under conditions partially different from those of the test cell of Example 13, and the cycle test of the test cell of Comparative Example 2 was performed under the same conditions as those of the test cell of Example 13. The cycle test of the test cell of Comparative Example 1 will be described below. Charging in the first cycle was performed at a constant current with a current density of 0.4 mA/cm², and a cutoff voltage was 0.15 V. By charging, Li, corresponding to a capacity of about 8.6 mAh/cm², was plated on the first Cu foil. Discharging in the first cycle was also performed at a constant current with a current density of 0.4 mA/cm². The discharging was stopped in a state where Li, corresponding to a capacity of about 2.3 mAh/cm², remained on the first Cu foil. Accordingly, Li corresponding to a capacity of about 6.3 mAh/cm² was plated on the second Cu foil. Charging and discharging in the second and subsequent cycles were repeated under constant current conditions, that is, the current density was 0.4 mA/cm² and the cutoff voltage was 0.15 V for the second to fourth cycles and the current density was 1.0 mA/cm² and the cutoff voltage was 0.3 V for the fifth and subsequent cycles, such that the amount of Li moving between the first Cu foil and the second Cu foil corresponded to a capacity of about 4 mAh/cm².

Figure 15:
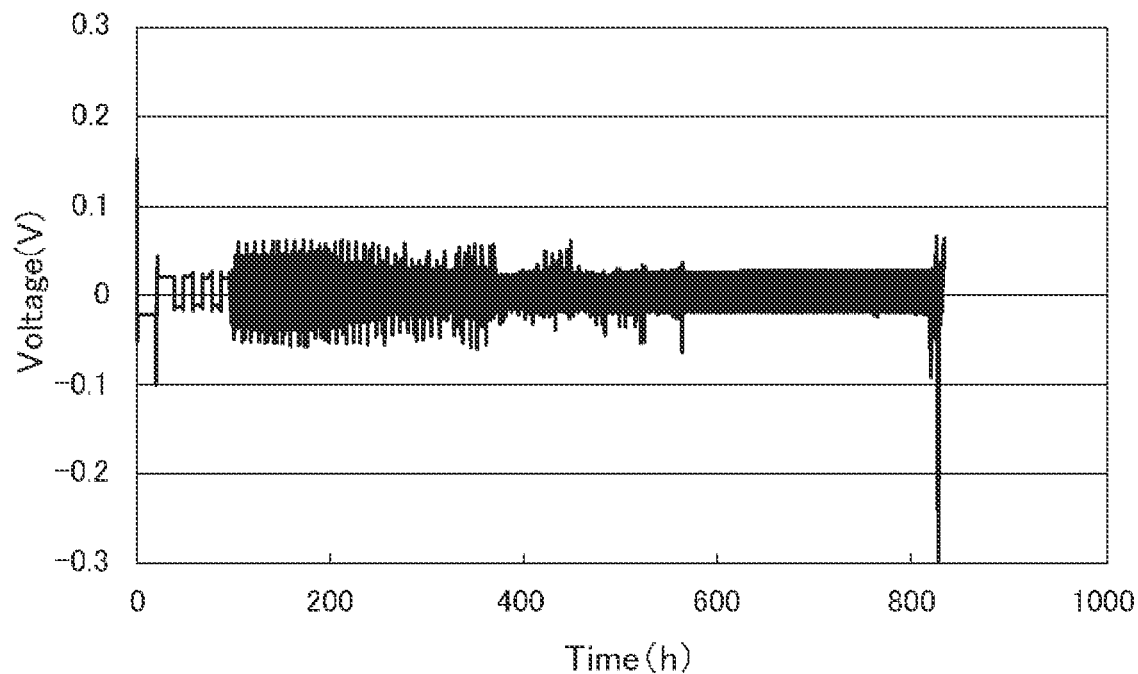
FIG. 15 is a graph showing a result of a cycle test in a test cell according to Example 13.
Figure 16:
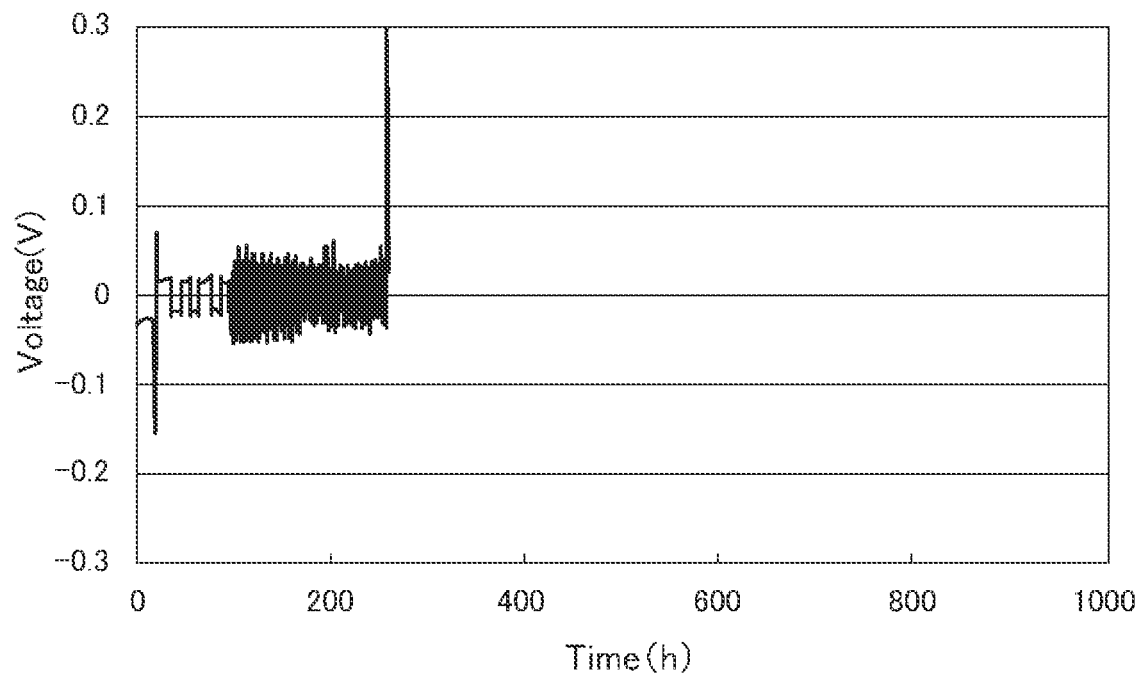
FIG. 16 is a graph showing a result of a cycle test in a test cell according to Comparative Example 1.
Figure 17:
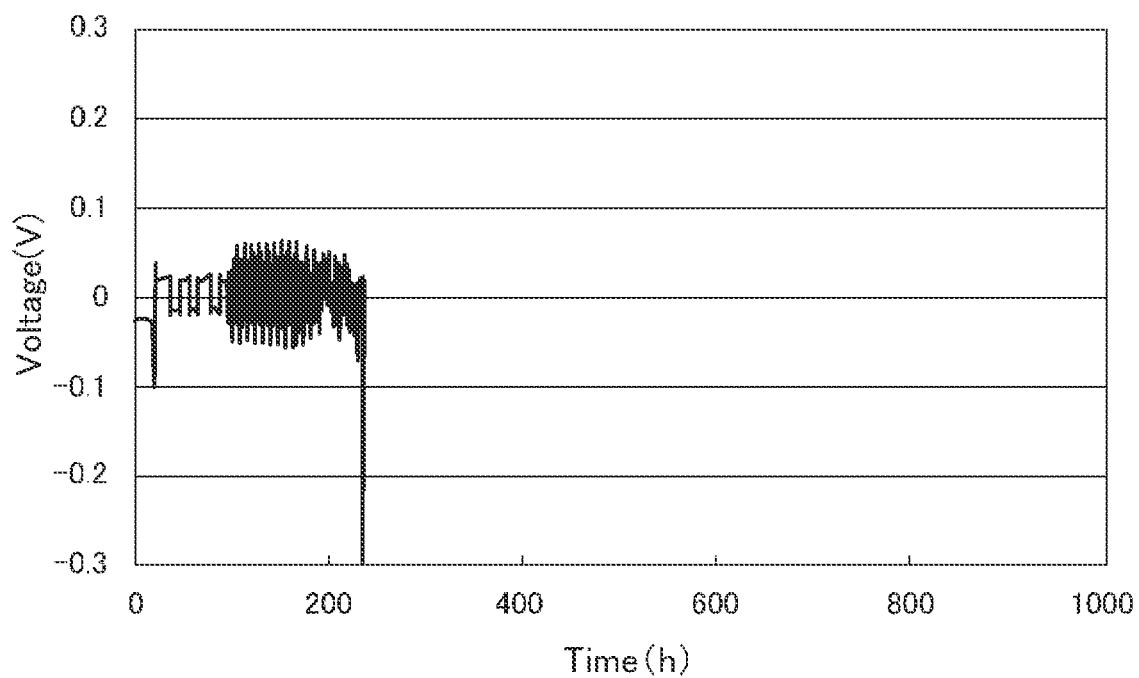
FIG. 17 is a graph showing a result of a cycle test in a test cell according to Comparative Example 2.

A result of the cycle test of the test cell of Example 13 is shown in FIG. 15. A result of the cycle test of the test cell of Comparative Example 1 is shown in FIG. 16. A result of the cycle test of the test cell of Comparative Example 2 is shown in FIG. 17. In FIGS. 15 to 17, a vertical axis represents voltage and a horizontal axis represents time.

From FIG. 15, it was confirmed that the test cell of Example 13 was capable of operating for 94 cycles. A total mass of a mass of one Li foil (2.67 mg/cm²) having a thickness of 50 μm and a mass of two composite films (a mass of Cu is 0.12 mg/cm² and a mass of CNT is 0.28 mg/cm² per composite film) forming the first electrode and the second electrode is 3.47 mg/cm², and since two electrodes each having a design capacity of 4 mAh/cm² are provided, the gravimetric capacity per electrode is 2305 mAh/g. In the test cell of Comparative Example 1, as shown in FIG. 16, it confirmed that an absolute value of a voltage rapidly increased in the 24th cycle. It is considered that this is because when the nucleus generation density of Li on the Cu foil is low and a volume of Li nuclei changes significantly, Li is consumed when SEI is repeatedly destroyed and reformed due to charging and discharging, dendrites that have grown large are electrically isolated from the Cu foil during dissolution and cannot contribute to charging and discharging, and the active Li is depleted. In the test cell of Comparative Example 2, as shown in FIG. 17, it was confirmed that the absolute value of the voltage rapidly increased in the 22nd cycle. It is considered that although a sponge-like structure is used for the electrodes, the formation of large dendrites is not sufficiently prevented due to the absence of seed particles, and as a result, the cycle characteristics are inferior to those of Example 13. In the test cell of Comparative Example 3, a total mass of a mass of one Li foil (26.7 mg/cm²) having a thickness of 500 μm and a mass of two composite films (a mass of Cu is 0.12 mg/cm² and a mass of CNT is 0.28 mg/cm² per composite film) forming the first electrode and the second electrode is 31.1 mg/cm², and since two electrodes each having a design capacity of 4 mAh/cm² are provided, the gravimetric capacity is 257 mAh/g. In the test cell of Comparative Example 3, Li that does not contribute to charging and discharging remains in a state of a foil having a thickness of about 450 μm, and therefore, the gravimetric capacity and the volumetric capacity are lower than those of the test cell of Example 13. From the above, in the test cell of Example 13, it was confirmed that by providing a plurality of seed particles to be nuclei for plating of Li during charging, the formation of large dendrites was prevented, the consumption of Li was reduced, and excellent cycle characteristics were obtained.

REFERENCE SIGN LIST

10, 10A, 10B: secondary battery
11: separator
12, 12A, 12B: secondary battery positive electrode
13, 13A, 13B: secondary battery negative electrode
14: first carbon nanotubes
15: first three-dimensional current collector
16, 16A, 16B: positive electrode active material
17: second carbon nanotubes
18: second three-dimensional current collector
19, 19A, 19B: negative electrode active material
20: seed particles

The invention claimed is:

1. A secondary battery negative electrode, comprising:
a three-dimensional current collector formed of a self-supporting sponge-like structure of carbon nanotubes;
a metal active material contained inside pores of the self-supporting sponge-like structure; and
a plurality of seed particles contained inside the pores of the self-supporting sponge-like structure, dispersed throughout the self-supporting sponge-like structure, and made of a material different from the metal active material, wherein
the number of the plurality of seed particles per electrode area is $1\times10^8/cm^2$ or more, and
the secondary battery negative electrode does not include a foil of the metal active material.

2. The secondary battery negative electrode according to claim 1, wherein
a diameter of each of the carbon nanotubes is smaller than a diameter of each of the plurality of seed particles.

3. The secondary battery negative electrode according to claim 1, wherein
the metal active material is made of at least one selected from the group consisting of Li, Na, Mg, Ca, K, Al, and Zn.

4. The secondary battery negative electrode according to claim 1, wherein
the carbon nanotubes each has a diameter of 20 nm or less and have a specific surface area of 200 $m^2/g$ or more.

5. The secondary battery negative electrode according to claim 4, wherein
the carbon nanotubes have an average number of layers of 1 or more and 5 or less.

6. The secondary battery negative electrode according to claim 1, wherein
the plurality of seed particles are made of at least one selected from the group consisting of C, Mg, Al, Si, Sn, Zn, Cu, Ag, Au, and Pt.

7. The secondary battery negative electrode according to claim 1, wherein
a thickness of the secondary battery negative electrode changes reversibly with charging and discharging, the thickness increases during charging, the thickness decreases during discharging, and a value obtained by dividing the thickness in a charged state by the thickness in a discharged state is 1.15 or more.

8. A secondary battery, comprising:
the secondary battery negative electrode according to claim 7; and
a secondary battery positive electrode whose thickness changes reversibly with charging and discharging and whose thickness decreases during charging and increases during discharging.

* * * * *